United States Patent Office 3,299,982
Patented Jan. 24, 1967

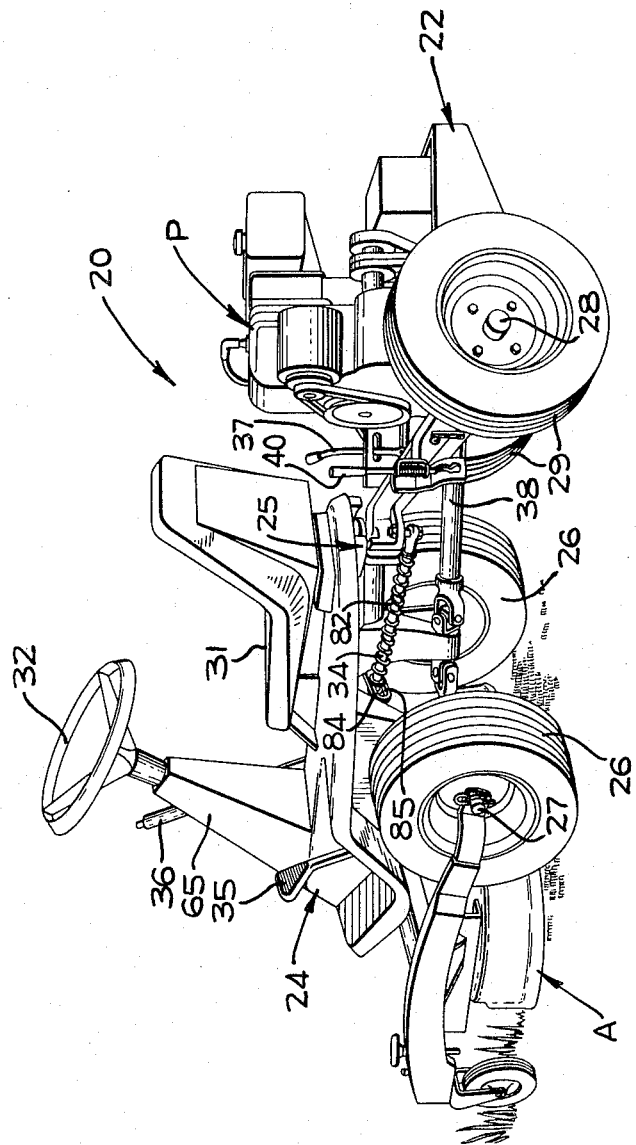

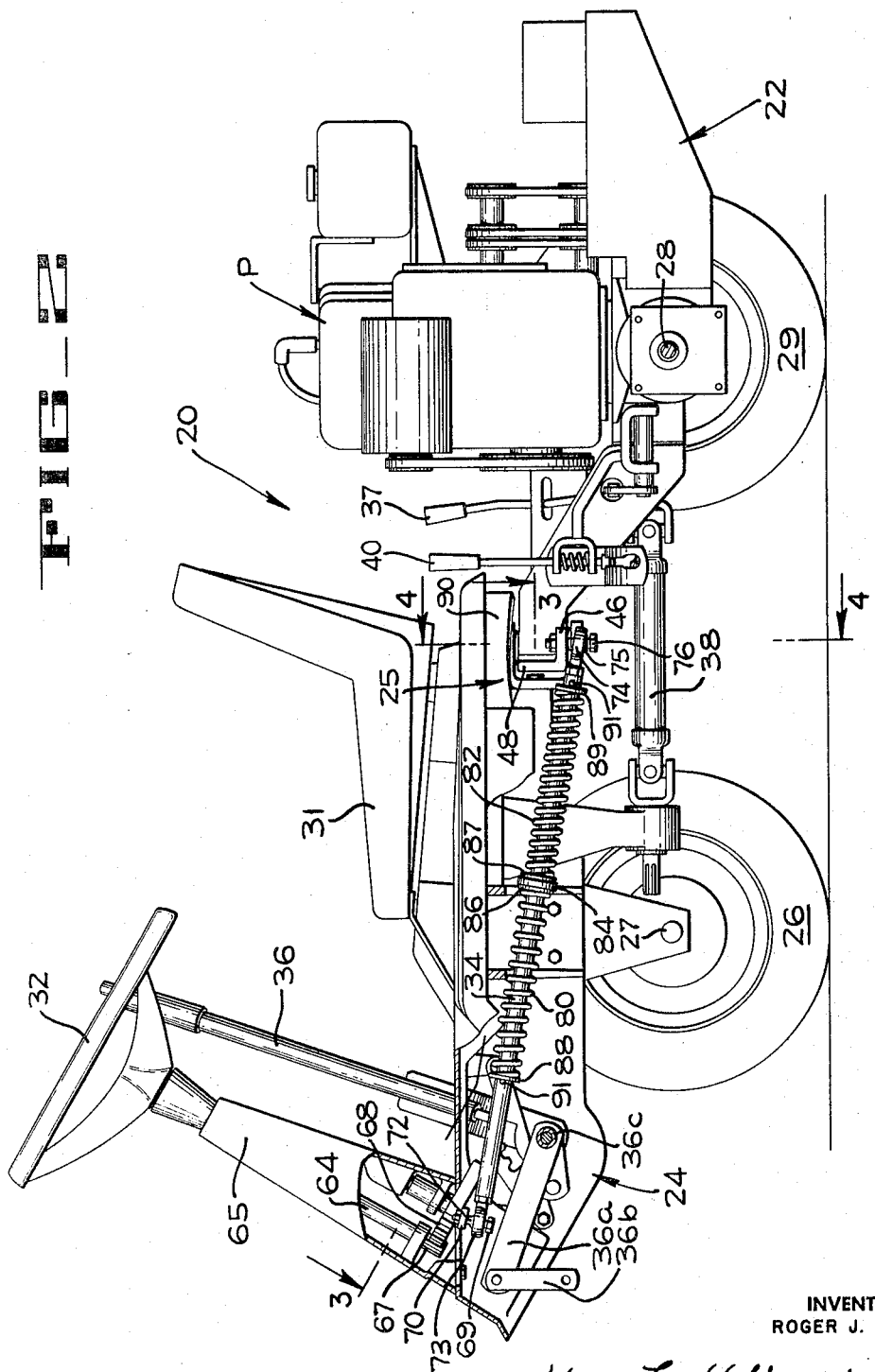

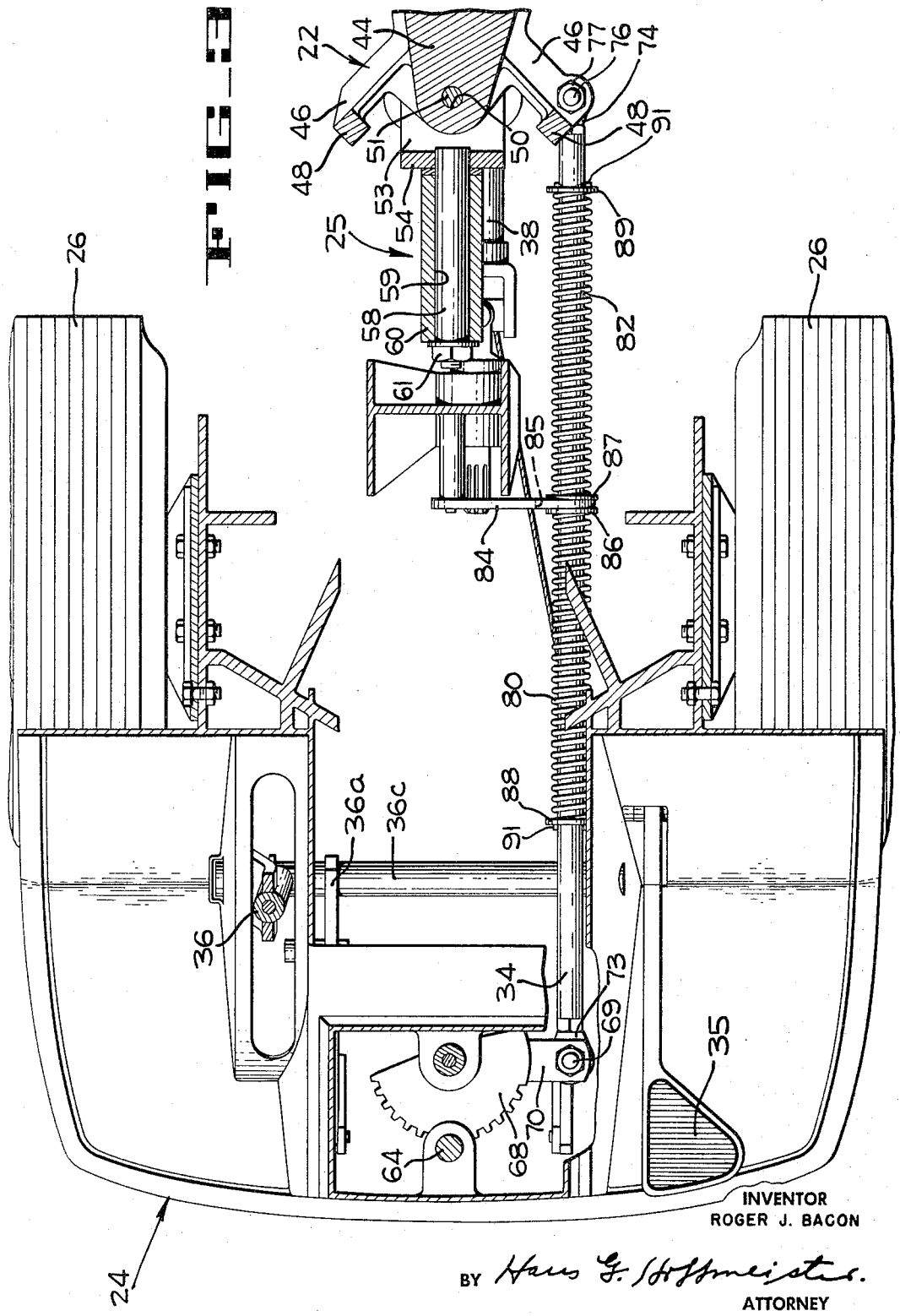

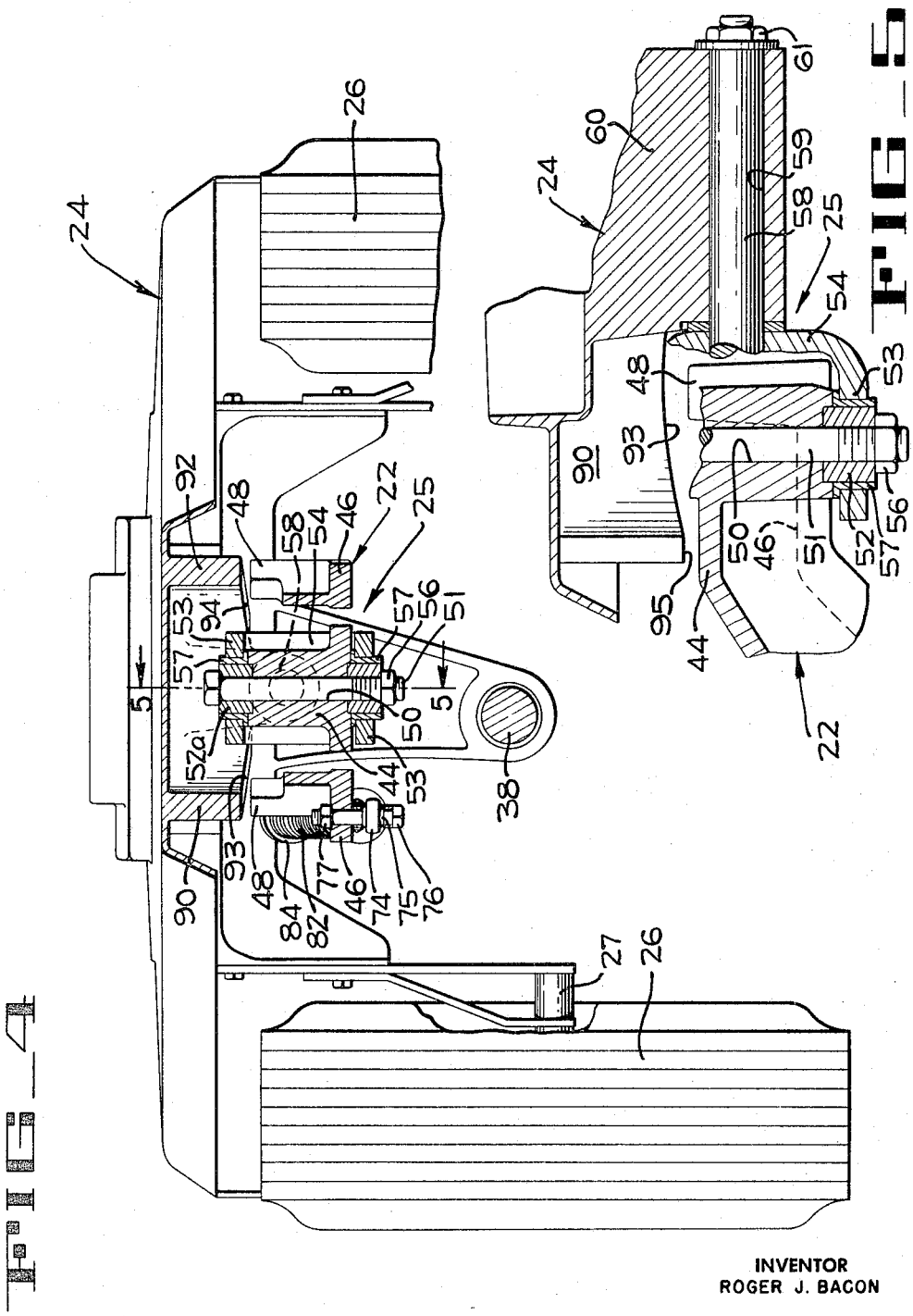

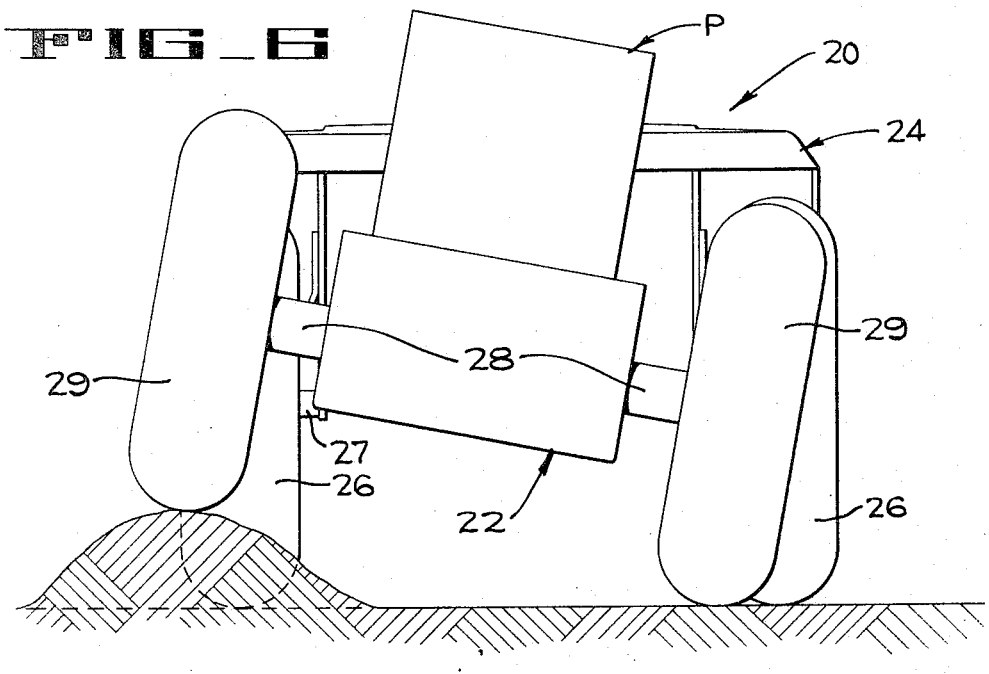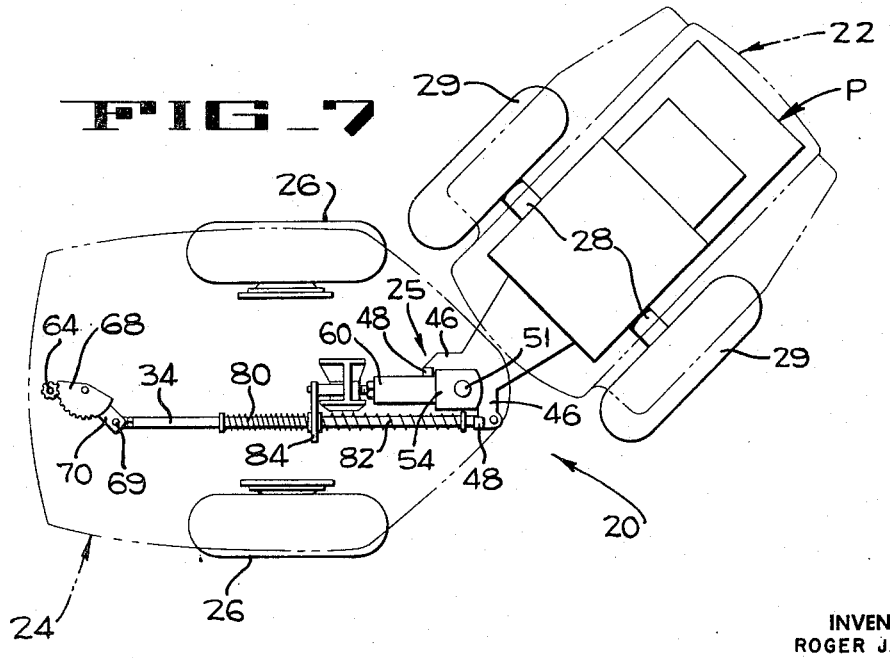

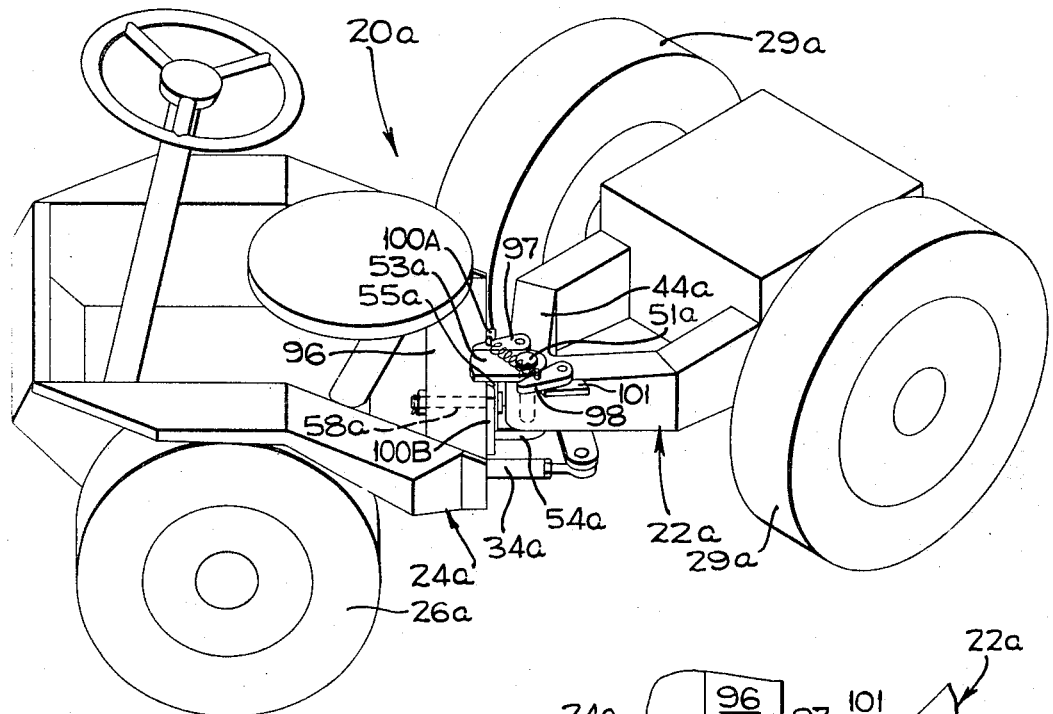
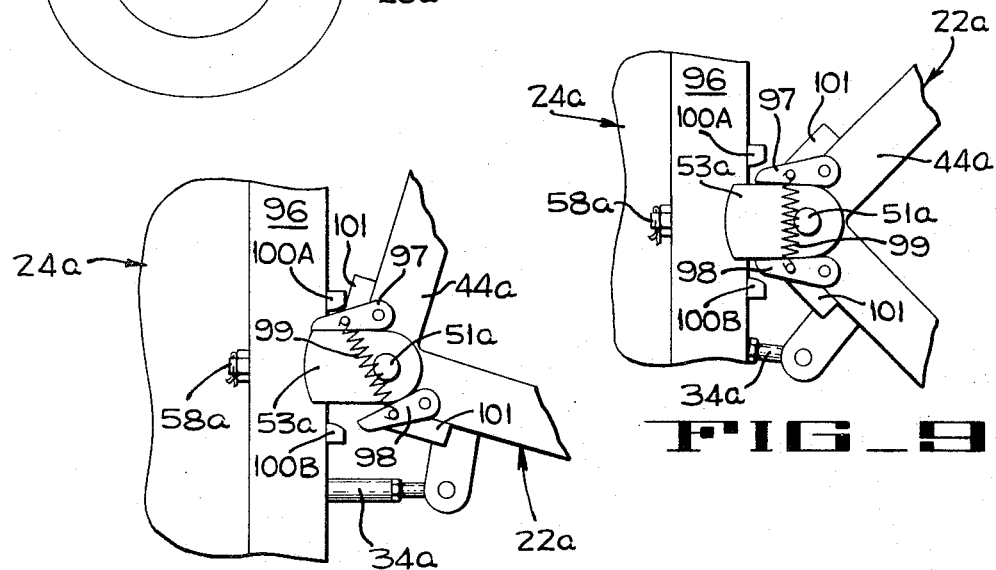

3,299,982
ARTICULATED VEHICLE WITH PIVOTABLE
FRAME STEERING
Roger J. Bacon, Port Washington, Wis., assignor to FMC
Corporation, San Jose, Calif., a corporation of Delaware
Filed Sept. 14, 1964, Ser. No. 396,255
8 Claims. (Cl. 180—52)

The present invention pertains to an articulated vehicle with pivotable frame steering, and more particularly to an articulated vehicle comprising a two-wheeled power unit and a two-wheeled riding unit, which units are coupled at approximately the midpoint between the two sets of wheels so as to allow for the relative rotation of the units about both vertical and horizontal axes.

The design and building of small tractor-like vehicles has long presented problems to the industry. These vehicles, which may be used for small tasks about the home and garden such as lawn cutting, snow removal, and the like, usually are modeled after the large, conventional tractors or other heavy duty equipment. However, one of the most desired characteristics of these smaller vehicles is that they be highly maneuverable since they are generally operated within specific, limited areas. This characteristic is not usually found in the larger vehicles and, therefore, most of the lightweight low-power vehicles in use today are not provided with the optimum design in view of their ultimate use.

The vehicle of the present invention departs from the traditional low-power vehicle concepts and utilizes a two piece frame having a pivot connection at the center of the vehicle joining the two otherwise independent sections of the frame. This pivot connection permits relative pivotal movement of the frame sections about both a vertical axis and a longitudinal horizontal axis. The rearward frame section is the power section supplying the driving power for the vehicle, while the forward frame section is adapted to carry the driver of the vehicle as well as the operative implement which the vehicle is designed to use, for example, a power mower. The steering is effected by changing the angle, in a horizontal plane, between the frame sections. That is to say, when the vehicle is to be turned, the front or riding section is pivoted in its entirety relative to the rear frame section instead of merely having the wheels pivot as in conventional steering mechanisms. The advantage of such a method of steering is that the maneuverability and steering response of the vehicle is greatly increased whereby the vehicle can be made to perform quick and tight turns, closely circle objects such as trees and small shrubs, and maneuver into otherwise inaccessible areas with relative ease. Furthermore, the permissible independent oscillation of each of the frame sections about a longitudinal horizontal axis provides greater stability for the vehicle and permits all four wheels to be retained on the ground regardless of the roughness or unevenness of the terrain.

It is, therefore, an object of the present invention to provide a vehicle, having a pivotable frame type of steering, which is highly maneuverable and stable when operating upon a rough or uneven ground surface.

Another object of the present invention is to provide a two-section vehicle in which a quick response in steering is achieved by causing one section of the vehicle to be pivoted relative to the other about a vertical axis while said sections remain free to pivot relatively to each other about a horizontal axis running longitudinally of the vehicle.

Another object of the present invention is to provide an articulated vehicle having front and rear sections which are designed for relative pivotal movement about both a vertical axis and a longitudinal horizontal axis and whereby the independent movement of the sections about the horizontal axis is limited by the degree of relative pivotal movement about the vertical axis so as to keep the vehicle in a stable position when it is turning in the horizontal plane.

Another object of the present invention is to provide a joint for permitting relative pivotal movement about both vertical and horizontal axes but which limits the pivotal movement about the horizontal axis during relative pivotal movement about the vertical axis.

Other objects and advantages of the present invention will become apparent from the following description and accompanying drawings in which:

FIGURE 1 is a perspective of the vehicle of the present invention illustrating its use with a power mower attachment.

FIGURE 2 is a side elevation of vehicle of the present invention with parts thereof being broken away for the purpose of illustration.

FIGURE 3 is a longitudinal horizontal section taken along the line 3—3 of FIGURE 2.

FIGURE 4 is a fragmentary vertical section taken along the lines 4—4 of FIGURE 2.

FIGURE 5 is a fragmentary vertical section of the pivotal connection between the front and rear frame sections of the vehicle taken along lines 5—5 of FIGURE 4, with parts broken away.

FIGURE 6 is a diagrammatic rear elevation of the vehicle illustrating the manner in which the rear frame section of the vehicle is allowed to pivot relatively to the front frame section of the vehicle about a longitudinal horizontal axis.

FIGURE 7 is a diagrammatic plan view of the vehicle illustrating the manner in which the vehicle is steered, and the manner in which the front and rear frame sections are pivoted relatively to each other about a vertical axis.

FIGURE 8 is a diagrammatic perspective of a modified vehicle embodying the principles of the present invention.

FIGURE 9 is an enlarged diagrammatic plan of the pivotal connection between the frame sections of the vehicle illustrated in FIGURE 8, the sections being illustrated in their normal aligned position.

FIGURE 10 is a diagrammatic plan, similar to FIGURE 9, but showing the frame sections in a relatively pivoted condition when the vehicle is turned.

Referring now more particularly to the drawings, FIGURE 1 shows an articulated vehicle 20 which is comprised of a rear frame section 22 and a front frame section 24, which sections are connected together at the two-way pivotal connection 25. The front frame section 24 is provided with two wheels 26 each of which is rotatably mounted upon a wheel spindle 27 (FIG. 4) at each side of the frame section. The rear frame section 22 contains a power unit P which acts through a rear axle 28 to drive a set of rear wheels 29 during the operation of the vehicle. This power unit includes a gasoline engine, transmission, differential, and rear axle drive mechanism, all of which are conventional in design and are interconnected in the conventional manner to provide a ready source of power for the rear wheels 29. Since the details of these elements are not critical to an understanding of the present invention, they will not be further described.

The operator of the vehicle sits upon a seat 31 mounted atop the forward frame section 24 where he is free from the gasoline fumes and the vibrations of the power unit which is mounted on the rear frame section 22. From this vantage point he can control the vehicle through a steering wheel 32 which is connected to the rear frame structure at the pivotal connection 25 by means of a steering link 34, the details of which will later be described in greater detail. The operator of the vehicle also has access to a clutch and brake pedal 35 (FIG. 1), a gear shift lever 37, and an acceleration and choke control (not shown), all of which control the operation of the engine of the power unit P.

The front frame section 24 of the vehicle is adapted to carry an operating implement which in the case of the vehicle shown in FIGURE 1 is a power mower attachment A. This device is attached to the front frame section upon the wheel spindles 27, and it may be raised or lowered with respect to the ground surface by manipulation of a control lever 36 that is connected to the upper portion of the attachment A through two sets of links 36a and 36b (FIGURE 2), one only being shown, each link 36a being welded to a rotatable tubular shaft 36c to which lever 36 is welded. The attachment is provided with continuous driving power through a power-take-off shaft 38 which is geared to the transmission of the power unit P and may be engaged or disengaged by the operator through the the manipulation of a clutch lever 40 suitably disposed at the side of the vehicle.

The present invention is primarily concerned with the steering arrangement for the vehicle and particularly with the cooperation between the steering of the vehicle and the permissible relative pivotal movement of the front and rear frame sections 24 and 22 about a horizontal axis through the pivotal connection 25 that joins the two frame sections together. The construction of the the two frame sections togethere. The construction of the pivotal connection 25 is best shown in FIGURES 3, 4 and 5. The rear frame section 22 includes a tongue 44 which extends upwardly and forwardly of the main body of the frame. The outer end of the tongue is provided with a pair of ears 65 which extend outwardly from the body of the tongue and are angled slightly toward the front frame section. The distal end of each of the ears 46 is provided with an upstanding projection 48 of generally rectangular shape. The central body portion of the tongue includes a vertical passage 50 for the reception of a vertical pivot pin in the form of a bolt 51. This pin serves to rotatably join the rear frame section with the forward frame section, and the axis of the pin serves as a vertical pivot axis between the two frame sections. It is to be noted that the pivot pin is located exactly midway between the transverse axis through the front wheels 27 and the transverse axis of the rear wheels 29. This particular arrangement has been found to produce the optimum steering control.

The pivot bolt 51 is locked in the tongue 44 of the rear section by means of a nut 56 that bears against a tubular spacer 52 to draw the head of the bolt against a spacer 52a. The trunnion-like projections of the pivot pin and the spacers are rotatably mounted within a pair of cylindrical bearing members 57 pressed into a pair of parallel spaced horizontal flanges 53 of a pivot yoke 54. The yoke 54 is caused to rotate about the axis of the pivot pin as it is turned relative to the rear frame section when the vehicle is negotiating a turn. This turning movement is imparted to the yoke through a cylindrical pivot pin 58 which is secured in the vertical wall of the yoke and projects in a direction away from the flanges 53 to be rotatably received within a cylindrical passage 59 (FIG. 5) located within a downwardly extending central portion 60 of the front frame section 24. If desired, a sleeve bearing may be provided in the passage 59 to rotatably journal the pivot pin 58. The pin 58 is secured to the front frame section by a nut 61 which is threaded onto its distal end. Since the pin 58 is rotatably received in the front frame section, it serves as a means for permitting relative movement between the front and rear frame sections about a longitudinal horizontal axis.

FIGURES 6 and 7 diagrammatically illustrate the two types of relative movement between the frame sections which are permitted. In the rear view of FIGURE 6, it will be seen that the wheels 26 of the forward frame section 24 are resting upon a level ground surface while one of the wheels 29 of the rear frame section 22 is caused to transverse an elevated obstruction in the terrain. When this condition occurs, the entire rear frame section will be pivoted or oscillated relative to the front frame section as shown in FIGURE 6. This independent oscillatory movement of each of the frame sections is permitted by the freely rotatable mounting of the pin 58. In the top plan view of FIGURE 7 the vehicle is shown while it is being turned in the horizontal plane. Rather than merely pivoting the front wheels as in the conventional type of vehicle steering, it can be seen that the entire front frame section 24 will be pivoted relatively to the rear frame section 22 in the direction of the turn. This relative pivotal movement of the frame sections is permitted by the rotatable connection of the rear frame section with the flanges 53 of the pivot yoke 54.

The steering of the vehicle is accomplished by urging the two frame sections into an angled position, such as that shown in FIGURE 7, so that the vehicle will travel in a radial path with the rear wheels tracking the front wheels. Again, this is in contrast with the conventional steering arrangements and is acomplished by means of the steering mechanism which is best shown in FIGURES 2 and 3. The steering wheel 32 is attached to a shaft 64 extending within a steering column housing 65 at the forward end of the front frame section 24. The end of the shaft is provided with circumferentially arranged teeth 67 which are adapted to engage with the teeth on a steering gear 68 that is also rotatably mounted within the steering column housing. The steering gear is provided with an outwardly extending flange 70 which is attached to the forward end of the rigid steering link 34 by means of a bolt 69 that extends through the flange 70 and through a spherical bearing element 72 that is pivotally mounted on a segmental spherical surface in an eye-bolt 73 threaded in the end of link 34. The trailing end of the steering link is directly attached to the rear frame section at one of the outwardly extending ears 46 on the tongue 44. This latter connection is also obtained through an eye-bolt 74 that has a segmental spherical surface receiving a spherical bearing 75 through which a bolt 76 extends and is secured to the ear 46 by a nut 77.

When the steering wheel 32 is turned by the operator of the vehicle, the effect is to rotate the steering gear 68 and thus either pull the steering link 34 forwardly or push it rearwardly with respect to the front frame section. Since the trailing end of the steering link is attached to the ear 46, a torque is thereby exerted about the axis of the pivot pin 51, and the front frame section is urged in one direction or the other with respect to the rear frame section so that the angle between the sections becomes something less than 180°. Since the vehicle will be in motion during a turn, the resultant increase or decrease in the effective length of the connection between the front and rear frame sections will result in the front frame section being pivoted in the direction of the turn.

When it is desired to straighten out the vehicle so that the front wheels 26 will again be longitudinally aligned with the rear wheels 29, the steering wheel 32 is turned in the opposite direction so that the steering link 34 assumes its normal position with respect to the front frame section 24 as is shown in FIGURES 2 and 3. To aid in the recovery of the vehicle to the normal condition wherein the frame sections are aligned and to assist in the control of the vehicle by maintaining this condition during its normal operation, a pair of coil-type compression springs 80 and 82 have been provided. These springs are placed in positions closely surrounding the steering link 34 and are separated by a spring retaining bracket 84 which is provided with a slot 85 through which the steering link 34 is received. Bracket 84 is securely bolted to a portion of the front frame section 24 and, therefore, does not change its position with respect to the front frame section when the vehicle is turned. The springs 80 and 82 are maintained in their positions surrounding the steering link by means of a pair of washers 86 and 87 which bear against the bracket 84 and a pair of washers 88 and 89 at the outer ends of the springs which bear against retaining pins 91 that are extended through the steering link (FIG. 3). When the vehicle is undergoing a turn, one of the springs will be further compressed (see FIGURE 7) since the flange 84 is fixed relative to the front frame section. This compressive force acts against the turning movement of the vehicle in direct proportion to the amount of turn imparted by the steering wheel, and it serves as an aid in restoring the vehicle to its normal position. Since the springs 80 and 82 are under some compression even when the frame sections are aligned, there is a continual biasing force acting to maintain the vehicle in this position. Even though the vehicle is comprised of two sections connected for two-way pivotal movement, it can be seen that it will remain stable and easy to control under normal operating conditions.

One of the most important features of the present invention is the limitation imposed upon the relative pivotal movement of the two frame sections about the horizontal axis of pin 58 (as shown in FIGURE 6 for example) when the vehicle is in a turn in the horizontal plane. When the vehicle is undergoing such a turn, as shown in FIGURE 7 for example, a counterclockwise rotation or oscillation of the front frame section relative to the rear frame section may result in an undesirable shifting of the center of gravity of the front section to the outside of the turn. This shifting of the front frame section in combination with the centrifugal forces imposed upon it during the turn may place the vehicle in an unstable position in which it can be tipped over. To prevent this condition from occurring, the permissible oscillation movement of the front frame section about the horizontal pin 58 is increasingly limited in the direction towards the outside of the turn in the horizontal plane as the degree of turn is increased. This is accomplished by means of a pair of downwardly projecting flanges 90 and 92 (FIG. 4) which extend downwardly from the upper portion of the front frame section at the rearward end of the central portion 60 so as to surround the upper end of the pivot yoke 54. The lower surfaces 93 and 94 of these flanges are arcuately curved so that the lowermost portion 95 of each flange is located to the rear of the front frame (FIG. 5). The flanges 90 and 92 are themselves curved in the longitudinal direction so that they will substantially overlie the arc traversed by the upstanding projections 48 on the tongue 44 as the rear frame section is caused to rotate about the axis of the pivot pin 51. Accordingly during relative pivotal movement of the two sections of the vehicle, there will be relative pivotal movement of one of the projections 48 and the associated surface 93 or 94 toward abutting contact to stop the pivotal movement of the vehicle sections. It can therefore be seen that the amount of permissible oscillation movement of the front frame section about the axis of the pin 58 is limited by the distance between the top surfaces of the upstanding projections 48 and the bottom surfaces 93 and 94 of the flanges 90 and 92. As the frame sections are pivoted in the horizontal plane, the distance between the upper surface of the projection 48 on the outer side of the turn and the corresponding surface 93 or 94 is decreased due to the curvature of the surface. Therefore, the permissible amount of oscillation movement of the front frame section about the pin 58 will also be decreased by a proportional amount. When the projection 48 engages the associated curved surface, the vehicle sections in effect act as a unit so that both front and rear sections must be tipped together toward the outside of the turn in order to overturn the vehicle. In spite of the fact that relative pivotal movement about a horizontal axis is permitted between the sections, there is no inherent instability when the vehicle is undergoing a turn.

It will be noted in FIGURE 7 that the angle of turn of the vehicle is limited by the engagement of one of the projections 48 with frame portion 60.

FIGURES 8, 9 and 10 illustrate a modified vehicle 20a of the present invention wherein the same steering principles are used as in the vehicle 20 described above. The vehicle 20a comprises a rear frame section 22a and a front frame section 24a which are joined together for pivotal movement about a vertical axis located approximately midway between the transverse axes of the front and rear wheels 26a and 29a. The tongue 44a which extends forwardly from the body of the rear frame section 22a is provided with a vertical aperture for rotatably receiving a pivot pin or bolt 51a. The pivot pin passes through openings in a pair of flat plate members 53a and 54a which are joined by a vertical cross piece 55a to provide a pivot yoke that is similar to the pivot yoke 54 of FIGURE 5. A horizontal pivot pin 58a is rigidly secured to the cross piece 55a and is rotatably received within a transverse beam 96 of the front frame section 24a at a point on the longitudinal centerline of the vehicle. Thus, as in the first described embodiment of the invention, relative pivotal movement between the two frame sections of the vehicle is permitted about a vertical axis through pivot pin 51a, and about a horizontal axis through pivot pin 58a. The steering of the vehicle is accomplished by means of the steering link 34a which is fixed at its trailing end to the tongue 44a of the rear frame section and is otherwise constructed and operated in the same manner as is the steering device described in connection with the vehicle 20.

The vehicle 20a also is provided with a means for limiting the permissible movement of the front frame section about the horizontal pivot axis while the vehicle is undergoing a turn in the horizontal plane. However, the means for accomplishing this objective is slightly different from the structure used in conjunction with the aforedescribed vehicle 20. As best seen in FIGURES 9 and 10, a pair of wedge-shaped members 97 and 98 are pivotally mounted upon the forward end of the tongue 44a. These wedge-shaped members are connected together by a tension spring 99 so that they will bear against the curved edge of the upper plate 53a. When the frame sections 22a and 24a are in alignment, the position of the wedge-shaped members 97 and 98 is as shown in FIGURE 9. During this operating condition, the permissible oscillation or pivotal movement of the front frame section about the pin 58a is determined by the spacing between the lowermost edges of the upper plate 53a and the top surface of the transverse beam 96. In the vehicle 20a, the clearance between the plate 53a and the beam 96 is such that the front frame section may pivot a maximum of approximately 10 degrees in either direction about the horizontal pivot pin 58a. When the vehicle is undergoing a turn the maximum permissible movement of the front frame section about the horizontal axis is less than 10 degrees and is determined by the spacing between the sloped outer edges of the wedge members and a pair of elongate abutment members 100A and 100B which are attached to the rear face of the transverse beam 96 and extend a short distance above the beam. FIGURE 10 illustrates a condition where the frame sections are relatively pivoted about the vertical pivot pin 51a to the maximum extent so that a pad 101 on the rear frame section is in engagement with the abutment member 100A. During this operating condition, the wedge members 97 and 98 will be cammed by the edge of the flat plate 53a to the positions shown. The wedge member 97 which is on the inside of the turn, will be slid along the outer edge of the plate so that the sloped outer edge of this member will be brought close to the associated abutment 100.

Since the member has a tapered shape, the spacing of its outer edge from the abutment 100 at any time during the turn will be in direct proportion to the degree of turn of the vehicle in the horizontal plane, and therefore, the maximum permissible outward pivoting of the front frame section about the horizontal axis will be decreased in the same proportion. If the turn is the maximum possible in the horizontal plane as in FIGURE 10, it can be seen that the wedge member 97 will be brought quite close to the abutment 100 so as to permit very little upward movement of the member 100A before said member engages the wedge member. Under these conditions there will be very little oscillation of the front frame section about the horizontal axis toward the outside of the turn which oscillation might tend to overturn the vehicle. In effect therefore, in a tight turn, the articulated vehicle behaves like a one-piece vehicle with undesirable oscillation between the frame sections about a horizontal axis being prevented.

It can be seen that the two vehicles of the present invention are particularly suited for quick maneuverability and steering control because of their articulated structure and their frame type of steering. This factor makes them ideal for low power needs such as found about the home and garden, for example, in the trimming of grass, the rolling of lawns, and the spreading of water or fertilizer and the like. Due to the double pivotal connection between the rear power section and the front riding section, the vehicle possesses a high degree of stability. All four of its wheels will be maintained on the ground surface at all times and, therefore, a mower attached to the front riding section will always be maintained in the proper grass-cutting position. The vehicle can be truned very rapidly since the entire front frame section is pivoted relatively to the rearward driving section. However, the stability of the vehicle during a quick turn will be maintained since the horizontal pivotal movement of the front frame section is controlled during such a turning movement.

While two embodiments of the present invention have been shown and described it will be understood that various changes and modifications may be made therein without departing from the spirit of the invention or the scope of the appended claims.

The invention having thus been described, what is believed to be new and desired to be protected by Letters Patent is:

1. An articulated vehicle comprising a two-wheeled front section and a rear pushing section, a joint connecting said sections for relative pivotal movement of said sections in a horizontal plane about a vertical axis and for pivotal movement of one section relative to the other about a longitudinal horizontal axis, means for limiting the relative pivotal movement of said sections about the vertical axis to a predetermined angular range from the normal aligned position of said sections, and means for uniformly progressively decreasing the permissible amount of pivotal movement of one section relative to the other about said longitudinal horizontal axis throughout said predetermined angular range in accordance with the decreasing of the angle between the sections in the horizontal plane.

2. An articulated vehicle comprising a two-wheeled front riding section and a rear pushing section, a joint connecting said sections for relative pivotal movement of said sections in a horizontal plane about a vertical axis and for pivotal movement of one section relative to the other about a longitudinal horizontal axis, a rigid member operatively connecting said sections and having an adjustable coupling with one of the sections whereby the effective length of the member may be changed so that the vehicle may be steered by changing the angle between said sections in the horizontal plane, means for limiting the relative pivotal movement of said sections about the vertical axis to a predetermined angular range from the normal aligned position of said sections, one of said sections being provided with a member having a sloping surface which is arranged to engage an abutment portion of the other section when the sections are relatively pivoted about said longitudinal horizontal axis in order to limit the amount of such pivotal movement, the point of engagement by said abutment portion on said sloping surface being determined by the angle between said sections in the horizontal plane whereby the maximum relative pivotal movement about said horizontal axis is uniformly progressively decreased throughout said predetermined angular range as said angle between said sections in the horizontal plane is decreased.

3. An articulated vehicle comprising a two-wheeled front riding section and a two-wheeled rear driving section, and a connecting link having a vertical pivotal connection and a horizontal pivot pin, said rear section being rotatably connected to said vertical pivotal connection and said front section being rotatably connected to said horizontal pivot pin whereby said sections are free to relatively pivot about either a vertical or a horizontal axis, means for limiting the relative pivotal movement of said rear section about the vertical pivotal connection to a predetermined angular range from the normal aligned position of said sections, one of said sections being provided with a surface sloping in the vertical direction, the other of said sections having an abutment portion arranged to engage said sloping surface when the sections are relatively rotated about the axis of the horizontal pivot pin, the slope of said surface being uniform throughout said predetermined angular range and such that the maximum permissible amount of rotational movement of one section relative to the other section about the axis of the horizontal pivot pin is uniformly and continuously decreased throughout said angular range as the angle between said sections in the horizontal plane is decreased.

4. An articulated vehicle comprising a two-wheeled front riding section and a two-wheeled rear driving section, a connecting member having a vertical pivot pin and a horizontal pivot pin, said rear section being rotatably connected to said vertical pivot pin, and said front section being rotatably connected to said horizontal pivot pin whereby said sections are free to relatively pivot about the axis of either of said pins, a pair of wedge-shaped members pivotally connected to one of said sections, and a pair of abutment surfaces provided on the other of said sections in a position to be engaged by the wedge-shaped members when the sections are rotated relatively to each other about the axis of the horizontal pivot pin, the slope of said wedge-shaped members being such that the maximum permissible amount of independent pivotal movement of one section about the horizontal axis is proportionately decreased as the angle between said sections in the horizontal plane is decreased.

5. An articulated vehicle comprising a two-wheeled front riding section and a two-wheeled rear driving section, a connecting link having a vertical pivotal connection and a horizontal pivot pin, said rear section being rotatably connected to said vertical pivotal connection, and said front section being rotatably connected to said horizontal pivot pin whereby said sections are free to relatively pivot about either a vertical or a horizontal axis, relative movement about said vertical pivotal connection being limited to a predetermined angular range from the normal aligned position of said sections, a pair of upstanding members located on said rear section and being spaced outwardly from and on either side of said connecting link, and a pair of flanges projecting downwardly from said front section and being arranged to overlie the path of said upstanding members throughout said angular range as the sections are relatively rotated about the vertical pivotal connection so that the maximum permissible relative rotation of said front section about the horizontal pivot pin at any particular time will be determined by the spacing between the upper surface of one of said upstanding members and the adjacent lowermost surface of the associated flange, the lowermost surfaces of said flanges being arcuately curved in the vertical direction so that said maximum permissible relative rotation of said front section is uniformly and continuously decreased throughout said angular range in accordance with the angle between said sections in the horizontal plane.

6. An articulated vehicle comprising a two-wheeled rear frame section and a two-wheeled front frame section, a pivotal connection joining said frame sections for relative pivotal movement about both a vertical and a longitudinal horizontal axis, a steering wheel and shaft mounted on said front frame section, a rotatable steering gear engaged with said shaft, a rigid member connected to said rear frame section and to said steering gear whereby rotation of said steering wheel will result in a change in the angle between said frame sections in a horizontal plane, a projecting portion of said front frame section being positioned closely adjacent to said rigid member, a pair of compression springs positioned about said rigid member on either side of said projecting portion of the front frame section, and a pair of stops attached to said rigid member to hold said springs in compression against said projecting portion of the front frame section whereby relative pivotal movement between said frame sections about said vertical axis will be opposed by said springs.

7. An articulated vehicle comprising a two-wheeled rear frame section and a two-wheeled front frame section, a power source mounted on said rear frame section for driving the rear wheels, a steering wheel and shaft mounted on said front frame section, a rigid steering link connected at one end with said rear frame section, an expansible connection joining the other end of said steering link with said shaft, spring means for maintaining said frame sections in longitudinal alignment under normal operating conditions, and a connecting member including a horizontal pivotal connection and a vertical pivotal connection, said front and rear frame sections being rotatably mounted at said pivotal connections for independent rotatational movement about both a vertical axis and a longitudinal horizontal axis, one of said frame sections including a sloping surface which is arranged to be engaged by a portion of the other of said frame sections when there is relative rotational movement between said frame sections about said horizontal axis, the slope of said sloping surface being such that the maximum permissible relative rotational movement between said frame sections in one direction is decreased as the angle between said frame sections in the horizontal plane is decreased through the adjustment of said expansible connection with said steering link.

8. An articulated vehicle comprising a two-wheeled front section and a rear pushing section, a joint connecting said sections for relative pivotal movement of said sections in a horizontal plane about a vertical axis and for pivotal movement of one section relative to the other about a longitudinal horizontal axis, said relative pivotal movement about the vertical axis being limited to a predetermined angular range from the normal aligned position of said sections, and means for progressively and continuously limiting the permissible amount of pivotal movement of one section relative to the other about said longitudinal horizontal axis in accordance with the angle between the sections in the horizontal plane when said sections are relatively moved through said entire angular range from the aligned position of the sections, said means including a member on one section swingable about said horizontal axis into abutting engagement with a member on the other section with the vertical distance between said members uniformly decreasing as said sections are relatively pivoted in the horizontal plane.

References Cited by the Examiner
UNITED STATES PATENTS

| 1,276,548 | 8/1918 | Litten | 280—442 |
| 2,400,522 | 5/1946 | Lantz | 280—492 |
| 2,972,850 | 2/1961 | Ariens et al. | 280—111 |
| 3,189,117 | 6/1965 | Ammon | 180—51 |

KENNETH H. BETTS, *Primary Examiner.*